March 26, 1963 N. E. COX 3,082,892
BOAT TRAILER
Filed June 29, 1960 5 Sheets-Sheet 3

Numan E. Cox
INVENTOR.

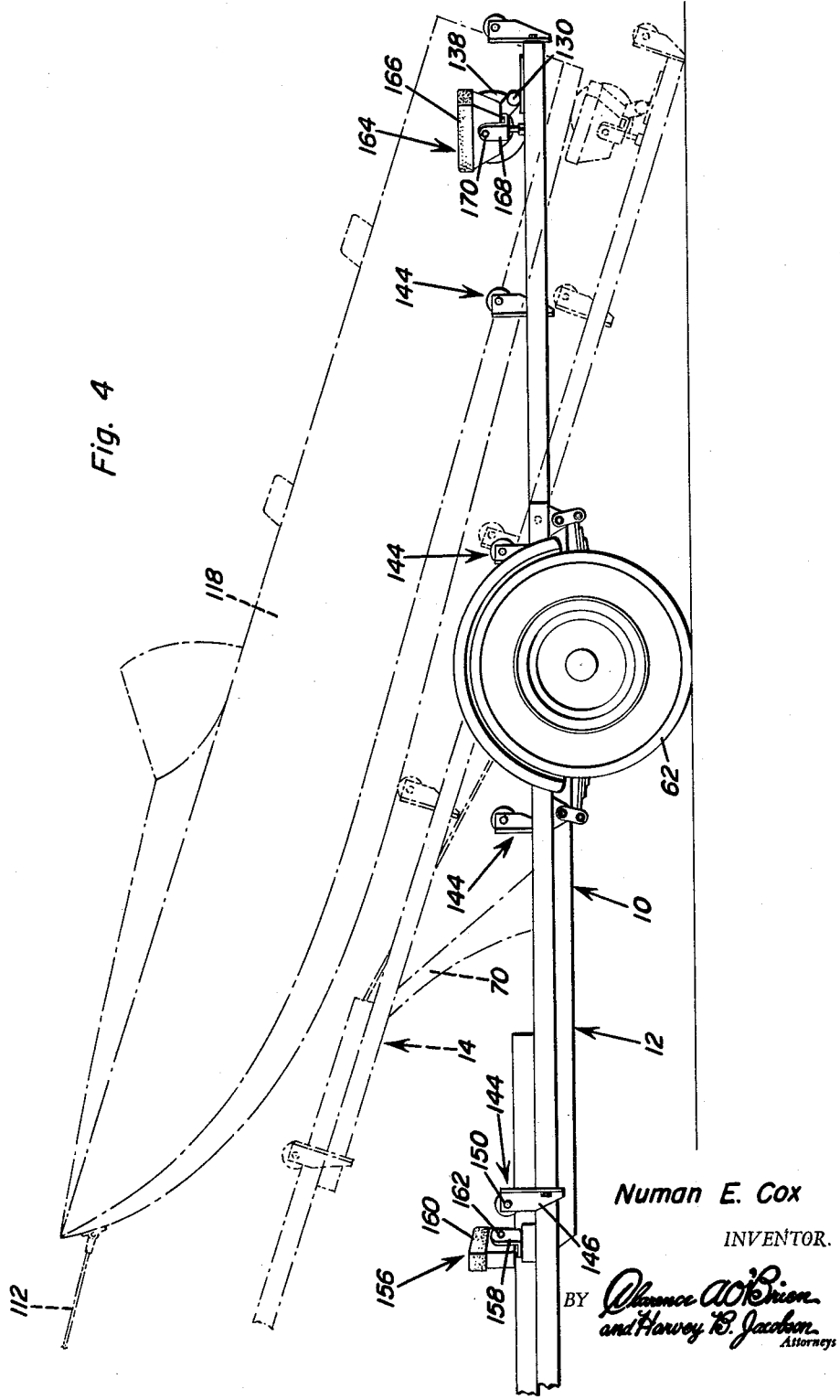

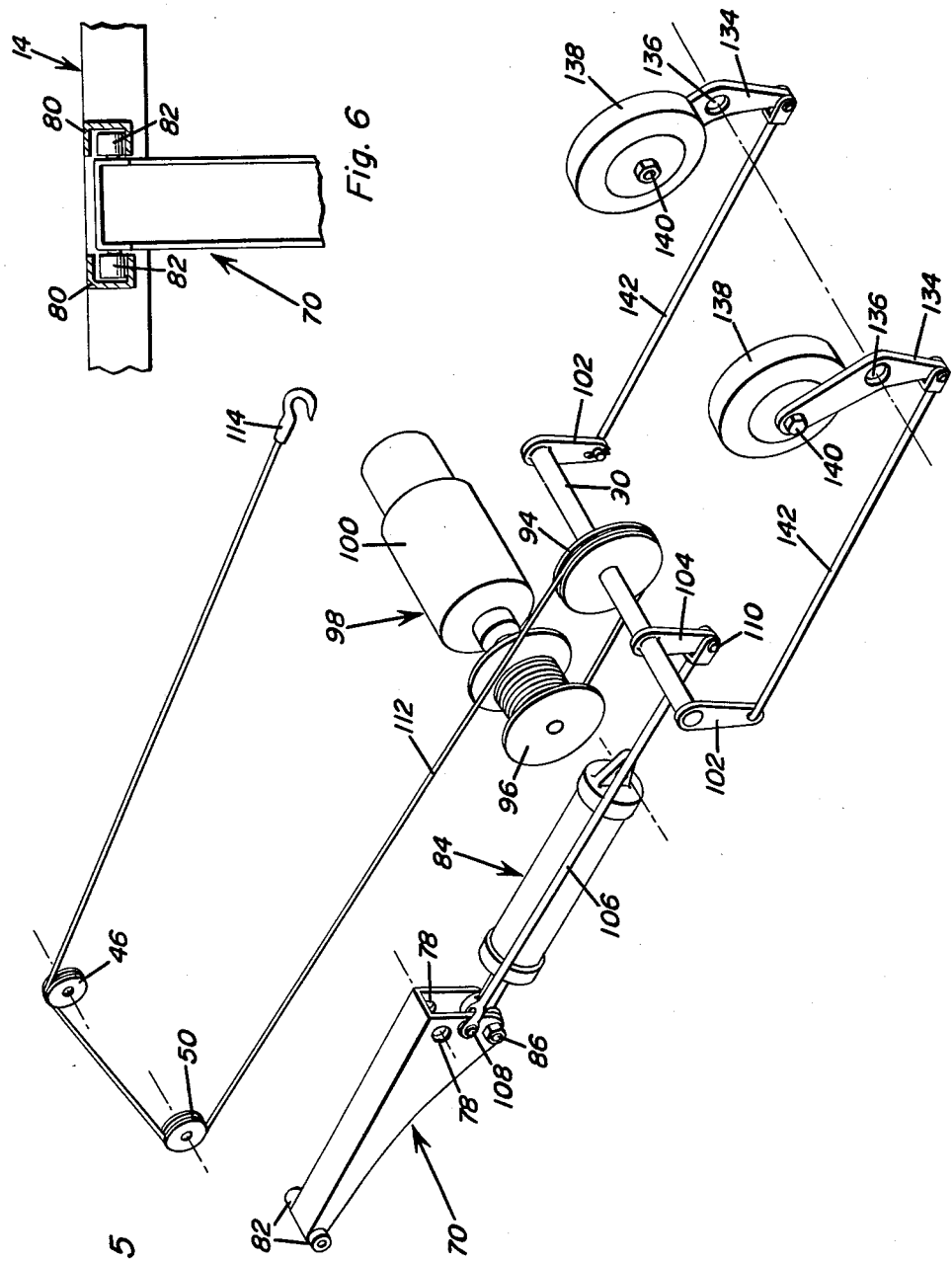

3,082,892
BOAT TRAILER
Numan E. Cox, P.O. Box 1124, Graham, Tex.
Filed June 29, 1960, Ser. No. 39,483
5 Claims. (Cl. 214—505)

This invention relates to a novel and useful type of boat trailer, and more particularly to a boat trailer including a tiltable frame section movably mounted for movement between a substantially horizontally disposed trailing position and a forwardly and upwardly inclined loading and unloading position. The boat trailer is provided with support pad assemblies adapted to support and cradle the lower surfaces of a boat at spaced points longitudinally therealong and also with roller support means adapted to cradle and support the lower surfaces of a boat at spaced points longitudinally therealong. The tiltable frame section includes means for elevating the roller support means relative to the pad assemblies upon movement of the tiltable frame section from a trailing position toward an inclined position. The pad assemblies are normally sufficiently vertically elevated relative to the roller support means to support and cradle a boat in elevated position above the roller support means whereby the boat may be trailed behind a draft vehicle while supported by pad assemblies having relatively large bearing surfaces. By providing the tiltable frame section with means for elevating the roller support means relative to the pad assemblies upon movement of the tiltable frame section toward an inclined loading and unloading position, the weight of the boat being carried by the trailer is transferred from the pad assemblies to the roller support means whereby the boat may then be moved longitudinally of the trailer during the loading and unloading operations with a minimum amount of friction between the boat and trailer.

Heretofore boat trailers were mainly used on infrequent occasions in order to transport boats from storage areas to points of use. Most boat owners utilizing trailers would normally store their boats in one location throughout the off seasonal months and then use a trailer to transport their boat to the area in which the boat was to be used at the beginning of the boating season. Boats would normally stay in this location until the end of the boating season when a boat trailer would then be used to transport the boat back to its storage area for the off season months.

However, boating is becoming more popular each year with the result being that boats are being trailed to and from the point of use each time they are used. If a boat is to be trailed over a substantial distance substantially every time it is to be used, it is extremely important that precautions be taken to protect the hull of the boat as it is being trailed.

When a boat is in the water the outer surfaces of its hull are not subjected normally to abrasive forces and localized areas of stress. However, a boat supported by a trailer and moved longitudinally of the trailer during the loading and unloading operations has the outer surfaces of its hull subjected to abrasive action and individual stress areas supporting the entire weight of the hull. Heretofore trailers of the tiltable type have been provided with supporting rollers for supporting and cradling a boat hull during the loading and unloading operations and also during movement of the boat from one location to another by means of the trailer.

Assuming that the rollers of a trailer using the rollers for the sole support of a boat carried thereby are constructed of at least a semi-rigid material, the contact between the rollers and the outer surfaces of the hull of the boat comprises a thin line contact extending in a direction paralleling the axis of rotation of the rollers and a length equal to the width of the roller being engaged by the boat hull.

With the size of boats frequently trailed increasing each year, rollers provided as a means for supporting a boat during trailing operations have proven to be undesirable inasmuch as the thin line contact between the rollers and the heavy boat hull places stresses upon the hull beyond that which the boat hull is designed to withstand.

As an alternate method of supporting a boat on a trailer during trailing operations, pad assemblies can be provided with large bearing surfaces for engagement with the lower surfaces of the boat. This alternative means of supporting a boat during trailing operations is highly desirable during the trailing operations inasmuch as the large load area of the pads distributes the portion of the weight of the boat supported by each pad over a large area. However, heavy boats do not slide easily when supported by these relatively large pad assemblies and therefore, particularly when using a boat trailer having a frame section of the tiltable type for unloading and loading the boat, the pad assemblies are undesirable because of the increased thrust which is needed to move the boat longitudinally of a trailer during the loading and unloading operations when the boat is supported by pad assemblies having large bearing areas.

In view of the foregoing, a need is obviously present for providing a boat trailer which will support a boat during the trailing operations by means of pad assemblies having large bearing areas and by means of roller assemblies during the loading and unloading operations.

Previous attempts to provide a trailer of this type have been made and with some success. However, all of the boat trailers heretofore provided with roller assemblies for supporting a boat during the loading and unloading operations and pad assemblies for supporting a boat during trailing operations have been constructed in a manner necessitating that a boat trailer supporting a boat in the trailing position must first have its roller means elevated above the pad assemblies and then have the tiltable frame section tilted to a position facilitating the removal of the boat therefrom. This requires considerable time and effort on the part of the boat owner and has therefore not been widely accepted.

It is the main object of this invention to provide a boat trailer of the type having a tiltable frame section with roller support means as well as supporting pad assemblies provided and the roller support means mounted in a manner relative to the supporting pad assemblies whereby the roller support means will be elevated relative to the pad assemblies upon the tilting of the tiltable trailer section to the loading and unloading position in order to transfer the load of the boat being supported by the trailer from the pad assemblies to the roller support means. In this manner, it is only necessary to tilt the tiltable frame section in order to transfer the load of the boat from the pad assemblies to the roller support means and vice versa.

A further object of this invention, in accordance with the preceding object, is to provide roller support means and supporting pad assemblies for a boat trailer which are each adapted to cradle and support the lower surfaces of a boat at spaced points longitudinally therealong.

A further object of this invention, in accordance with the preceding objects, is to provide thrust means adapted to be operatively connected to the bow of a boat and to effect a thrust in a direction paralleling the movement of a boat longitudinally of the trailer.

Still another object of this invention is to provide a boat trailer having a plurality of roller support means adapted to cradle and support the lower surfaces of a boat at spaced points longitudinally there along which each may be adjusted vertically relative to the trailer and a plurality of supporting pad assemblies adapted to cradle and support the lower surfaces of a boat at spaced points longitudinally there along which each also may be adjusted vertically relative to said trailer.

Still another object of this invention is to provide a boat trailer having motor means for adjustably tilting one trailer frame section relative to another and for effecting movement of a boat supported by the trailer longitudinally thereof with each of the motor means being provided with suitable controls operable from a single vantage point on the trailer.

And a final object to be specifically enumerated herein is to provide a boat trailer in accordance with the preceding objects which will conform to conventional forms of manufacture, be of simple construction and easy to operate so as to provide a device that will be economically feasible, long lasting and operable by substantially every boat owner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a side elevational view of the boat trailer with the latter shown in the trailing position in solid lines and in the inclined loading and unloading position in phantom lines and a boat shown in phantom lines being supported by the inclined section of the trailer;

FIGURE 5 is a diagrammatic view in perspective and on somewhat of an enlarged scale of the motor winch means of the trailer and the motor means for tilting the tiltable section of the trailer while simultaneously raising the lifting wheels of the roller support means of the trailer;

FIGURE 6 is a fragmentary enlarged transverse vertical sectional view taken substantially upon the plane indicated by the section line 6—6 of FIGURE 2 showing the manner in which the free end of the lifting arm is slidingly engaged with the tiltable section of the trailer; and FIGURE 7 is a side elevational view of the forward portion of the boat trailer.

Figure 1:
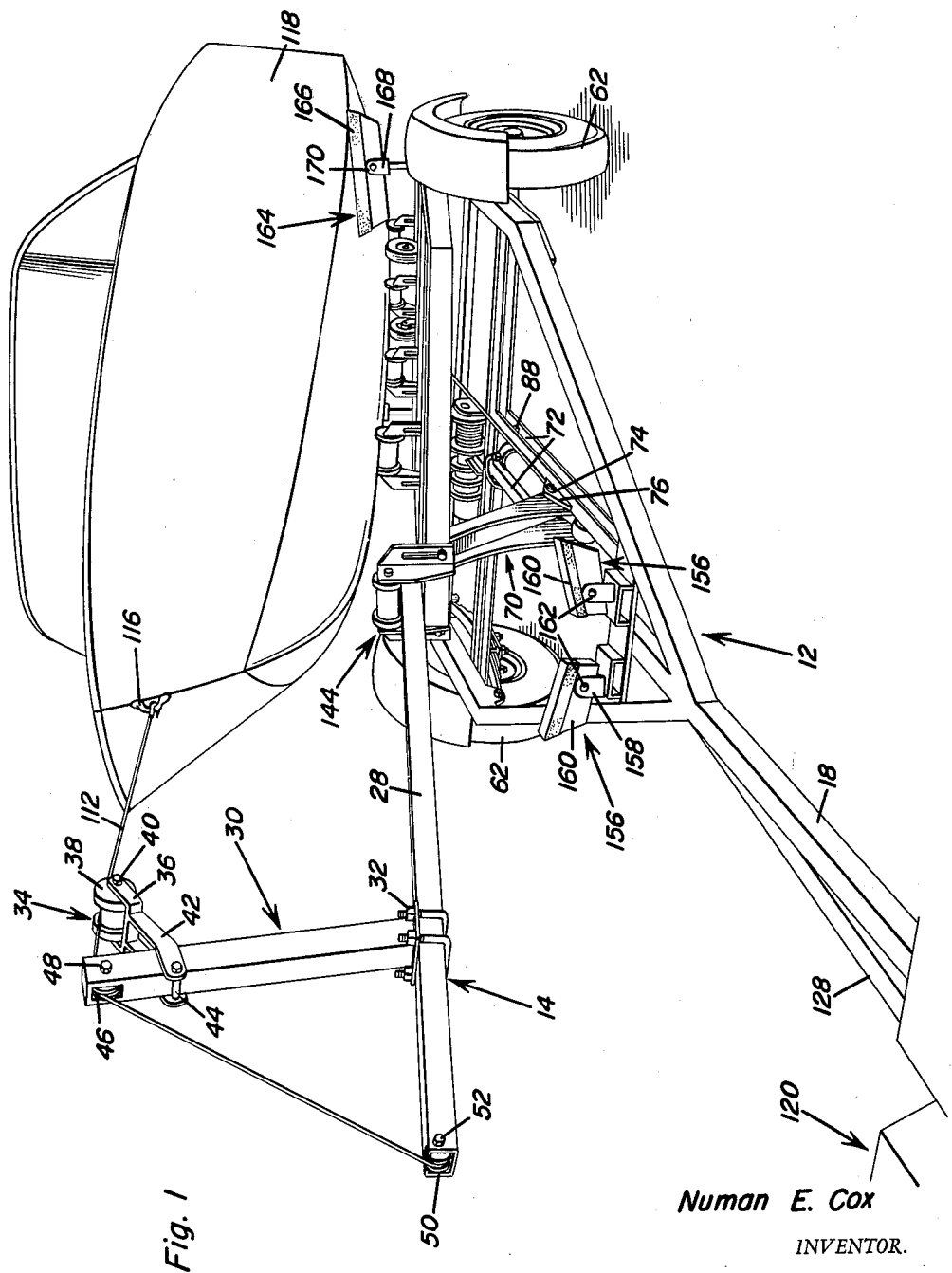
FIGURE 1 is a perspective view of the boat trailer with the tiltable section thereof shown in an inclined position and a boat supported thereby and resting upon the roller support means of the trailer.

Referring now more specifically to the drawings the numeral 10 generally designates the boat trailer of the instant invention which includes a main frame section generally designated by the reference numeral 12 and a tiltable cradle frame section generally referred to by the reference numeral 14.

The main frame section 12 includes a generally rectangularly shaped frame 16 tapered at its forward end and provided with a draft tongue 18. The forward end of the draft tongue 18 may be provided with any suitable ball hitch coupling element (not shown) for engagement with a complementary hitch element (not shown) carried by the rear end of the draft vehicle 20, see FIGURE 2. Additionally, the forward end of the tongue 18 is provided with a supporting wheel assembly generally referred to by the reference numeral 22. The supporting wheel assembly 22 includes a jack mechanism generally referred to by the reference numeral 24 having a supporting wheel 26 journaled for rotation at its lower end.

The tiltable frame or cradle section 14 is also generally rectangular in plan and tapers at its forward end. The cradle frame section 14 is provided with a tongue or boom 28 projecting forwardly from the cradle frame section 14 and overlying the draft tongue 18 of the main frame section 12.

Figure 2:
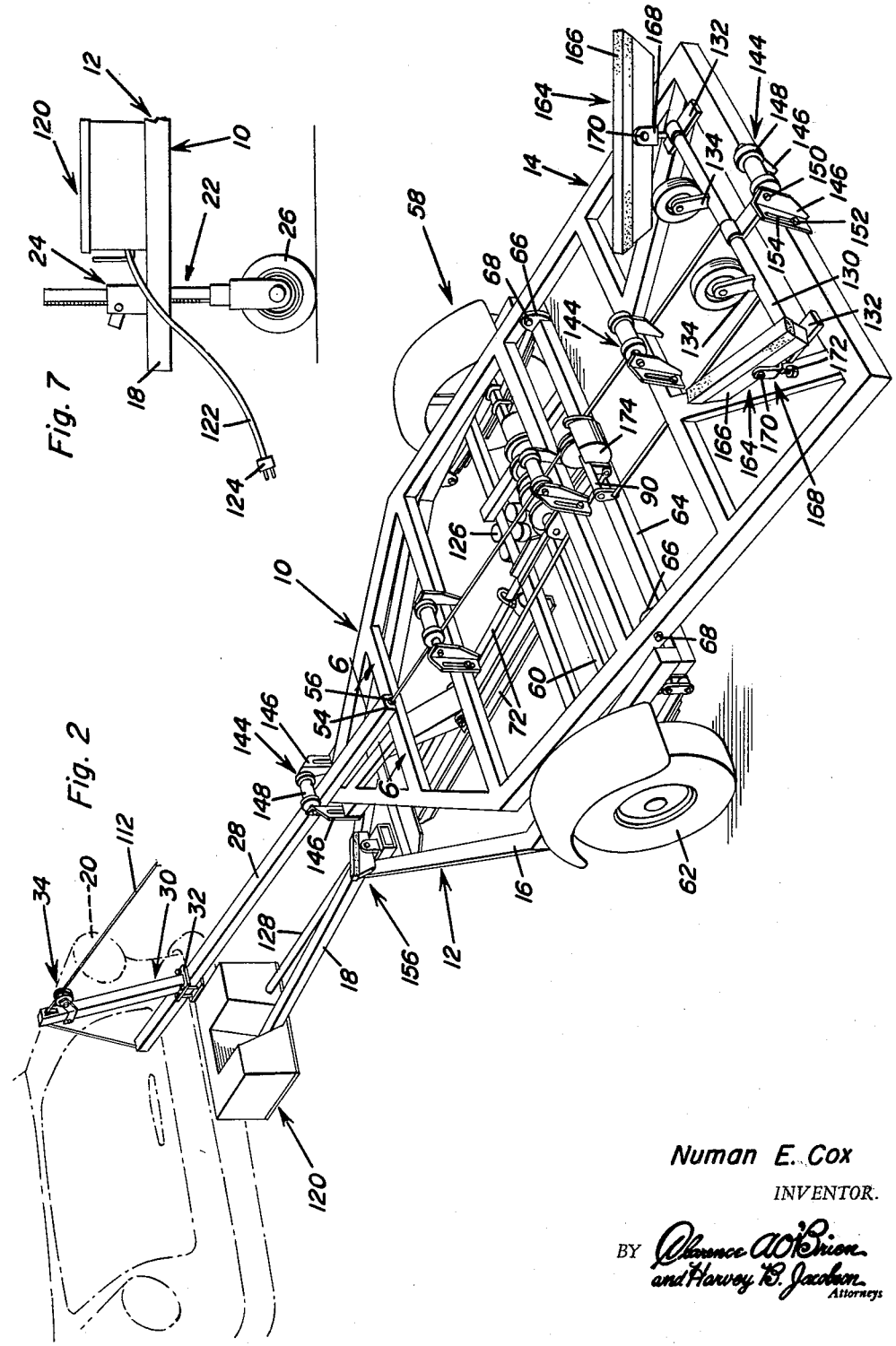
FIGURE 2 is a perspective view of the boat trailer shown with the tiltable section thereof in a slightly inclined position.

With attention now directed to FIGURES 2 and 5 of the drawings, it will be seen that the forward end of the boom 28 is provided with a standard assembly generally referred to by the reference numeral 30 which is secured to the boom 28 by means of a clamp assembly 32 carried by the lower end of the standard assembly 30 and engaged with the boom 28. The upper end portion of the standard assembly 30 is provided with a rigidly and adjustably mounted idler pulley assembly generally referred to by the reference numeral 34. The idler pulley assembly 34 includes a bifurcated bracket member 36 which rotatably journals a roller or pulley 38 by means of an axle pin 40 secured between the furcations of the bracket member 36. The bracket member 36 also includes a pair of forwardly projecting clamp arms 42 which are maintained in tight frictional engagement with the opposite sides of the standard assembly 30 by means of a fastener 44.

Thus it will be noted that the idler pulley assembly 34 may be adjusted vertically on the standard assembly 30 as desired.

The standard assembly 30 also includes a pulley 46 journaled for rotation about a transversely extending axis by means of pivot bolt 48. The pulleys 38 and 46 are in substantial alignment with each other and the forward end of the boom 28 is provided with a pulley 50 journaled for rotation about a transversely extending axis by means of pivot bolt 52. The pulley 50 is journaled for rotation between the opposite sides of the hollow boom 28 and is in substantial alignment with the pulleys 38 and 46. The rear end of the boom 28 is provided with a closure end wall 54 having an opening 56 formed therein for a purpose to be hereinafter more fully set forth.

The main frame section 12 is provided with a wheeled support assembly generally referred to by the reference numeral 58 including an axle 60 and a pair of ground engaging wheels 62 journaled on opposite ends of the axle 60.

The rear end portion of the main frame section 12 is provided with a transverse bracing member 64 including a pair of apertured upstanding lugs 66 on opposite ends thereof by which an intermediate portion of the cradle frame section 14 is pivotally secured to the main frame section 12 by means of pivot bolts 68. In this manner, the cradle frame section 14 is pivotally secured to the main frame section 12 for movement about a transversely extending axis passing through a mid-portion of the cradle frame section 14.

The main frame section 12, see FIGURE 1, is provided with a lift arm assembly generally referred to by the reference numeral 70 which is pivotally secured between a pair of spaced and longitudinally extending frame members 72 by means of a pair of aligned pivot bolts 74 secured through the mounting lugs 76 which are provided with aligned apertures and are fixedly secured to the upper surfaces of the frame members 72. The lift arm assembly 70 is generally U-shaped and is provided with a pair of aligned apertures 78, see FIGURE 5, through which the pivot bolts 74 are secured. The cradle frame section 14 is provided with a pair of spaced, opposed and longitudinally extending channel members 80, see FIGURE 6, which each defines a channel receiving one of the pair of rollers 82 journaled for rotation on the free end of the lift arm assembly 70.

One end of an extensible motor generally referred to by the reference numeral 84 and of the fluid pressure type is secured to the lift arm assembly 70 by means of a pivot bolt 86, see FIGURE 5 in particular. The other end of the extensible motor 84 is pivotally secured to the main frame section 12 between the frame members 72 by means of a pivot bolt 88. The axis of rotation of the pivot bolt 86 is laterally offset from a straight line passing through the axes of rotation of the rollers 82 and the pivot bolts 74 and it will thus be noted that upon actuation of the extensible motor 84 toward an extended position the lift arm assembly 70 will be pivoted about the pivot bolts 74 to an inclined position relative to the medial plane of the main frame section 12 whereby the rollers 82 will move longitudinally of the channel members 80 and incline the cradle frame section 14 relative to the main frame section 12 in a manner lifting the forward end of the cradle frame section 14.

Figure 3:
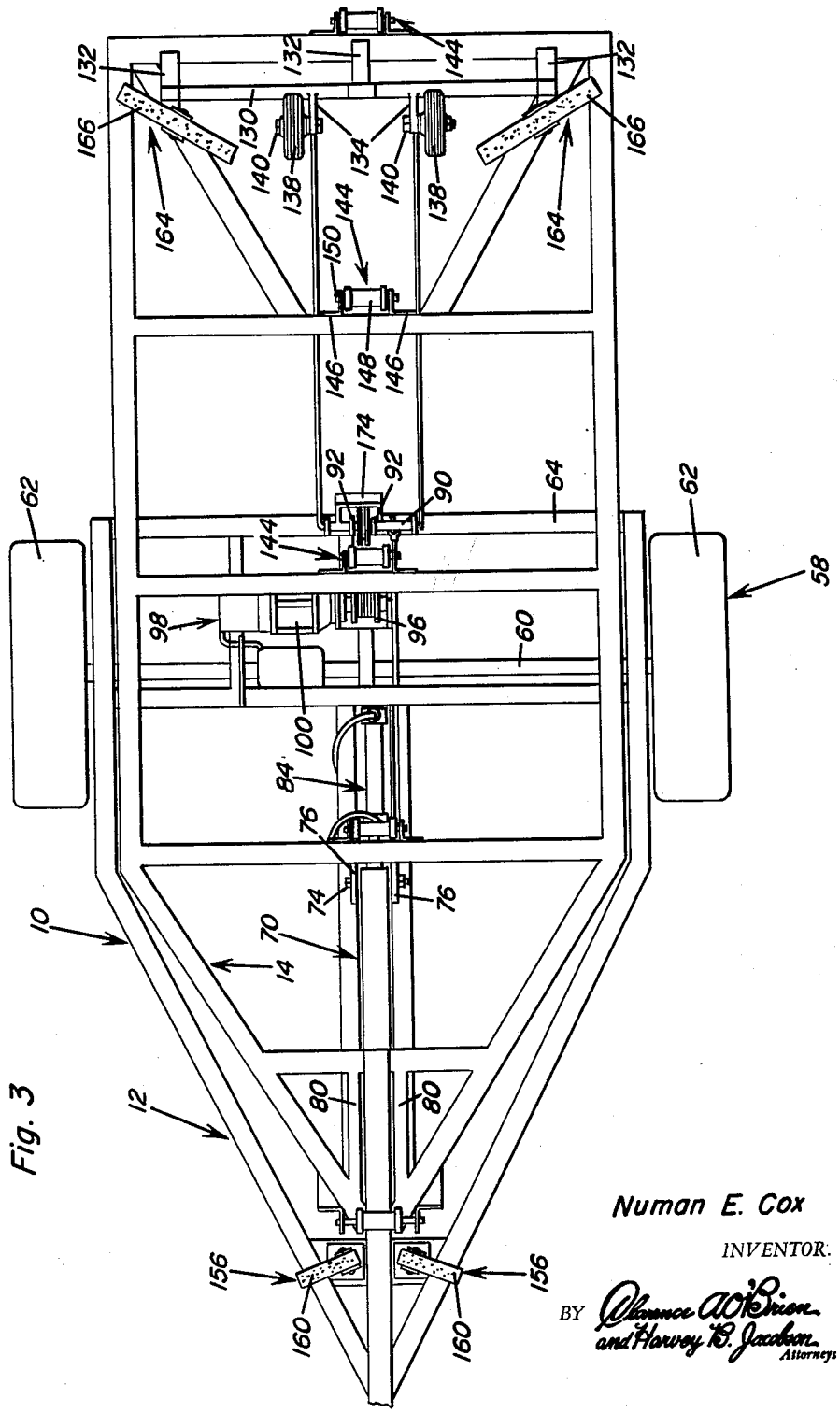
FIGURE 3 is a top plan view of the boat trailer.

With attention now directed more particularly to FIGURES 2, 3 and 5 of the drawings, it will be noted that a transversely extending actuating shaft 90 is journaled for rotation about an axis extending transversely of the trailer 10 by means of a pair of apertured mounting lugs 92 carried by the transverse bracing member 64 of the main frame section 12. It is to be noted that the axis of rotation of the actuating shaft 90 is aligned with the axis of rotation of the pivot bolts 68. An idler pulley 94 is journaled for rotation on the actuating shaft 90 and is aligned with the drum 96 of the winch mechanism generally referred to by the reference numeral 98 that may be supported by the main frame 12 in any conventional manner. The winch mechanism 98 includes a motor 100 for effecting rotation of the drum 96 for a purpose to be hereinafter more fully set forth.

The actuating shaft 90 has a pair of output crank arms 102 secured to its opposite ends for movement therewith and an input crank arm 104 fixedly secured thereto by which the actuating shaft 90 is operatively connected to the lift arm assembly 70 by means of a connecting link 106 whose opposite ends are pivotally secured to the lift arm 70 and the input crank arm 104 by means of pivot pins 108 and 110, respectively.

It will be noted that one end of a flexible tension member 112 is wound about the drum 96 and entrained over the idler pulley 94. The other end of the tension member 112 is passed through the opening 56 in the closure end wall 54 and forwardly through the boom 28 and entrained over the pulleys 50, 46 and 38 and is provided with a hook 114 on its free end which is adapted to be engaged with a hauling ring or eye 116 secured to the bow of the boat hull 118.

With attention now directed to FIGURE 7 of the drawings, it will be noted that the forward end of the draft tongue 18 of the main frame section 12 has a closure box generally indicated by the reference numeral 120. A suitable electrical conductor 122 is provided with a plug 124 on one end thereof adapted for engagement with a receptacle (not shown) carried by the draft vehicle 20 electrically connected to the electrical system thereof for supplying a source of current for the motor 100. The closure box 120 includes suitable controls (not shown) for operating the motor 100 in either direction. Additionally, the control or closure box 120 also includes a fluid pressure hydraulic system (not shown) for supplying fluid pressure to the extensible motor 84. Suitable valve assemblies (not shown) may be carried by the trailer 10 adjacent the fluid motor 84 and a plurality of electrical solenoids 126, see FIGURE 2, may be provided for electrically controlling these valves. Suitable controls (not shown) for the solenoids 126 may be housed in the closure box 120 whereby both the electrical motor 100 and the extensible motor 84 may be operated as desired from a single vantage point adjacent the forward end of the draft tongue of the trailer 10. In this manner, a single person may selectively or simultaneously raise and lower the cradle frame section 14 and actuate the drum 96 of the winch mechanism 98 in the direction desired. A conduit 128, see FIGURE 2, may be provided to house the electrical conductors and the fluid pressure lines (not shown) extending from the closure box 120 to the electric motor 110 and the valve assemblies (not shown) for the extensible motor 84 respectively.

An actuating shaft 130 is journaled for rotation about a substantially horizontally disposed axis extending transversely of the rear end of the cradle frame section 14 by means of journal members 132. A pair of apertured crank arms 134, see FIGURE 5, are secured to the actuating shaft 130 and mounted for rotation therewith. The crank arms 134 are provided with apertures 136 through which the actuating shaft 130 extends and one end of each of the crank arms 134 has a lifting wheel 138 journaled thereon by means of pivot bolt 140. The other end portion of each of the crank arms 134 is operatively connected to one of the output crank arms 102 carried by the actuating shaft 90 by means of a connecting link 142 whose opposite ends are pivotally secured to the crank arms 102 and 134 associated with that connecting link 142. Thus, it will be noted that the lifting wheels 138 are operatively connected to the cradle frame section 14 by means of the lift arm assembly 70, the connecting link 106 and the connecting links 142.

The cradle frame section 14 is provided with a plurality of support roller assemblies each generally designated by the reference numeral 144. Each of the support roller assemblies includes a pair of L-shaped brackets 146 having confronting flanges between which a roller 148 is journaled for rotation by means of a pivot pin 150.

The rollers 148 are substantially aligned and are spaced longitudinally of the cradle frame section 14. Each of the brackets 146 is adjustably secured to the associated cross member of the cradle frame section 14 by means of a fastener 152 passing through a slot 154 in the bracket 146. The fastener 152 is of course suitably secured through an opening formed in the associated cross member of the cradle frame section 14. In this manner, the support roller assemblies 144 may each be individually adjusted in elevation relative to the cradle frame section 14 in order to conform to the contour of the keel of the boat 118.

The main frame section 12 includes a pair of supporting pad assemblies each generally designated by the reference numeral 156 which includes a bifurcated bracket between whose furcations a pad element 160 is pivotally secured by means of a pivot pin 162. The supporting pad assemblies, see FIGURE 1 in particular, are spaced transversely of the main frame section 12 and define an area therebetween for receiving the forwardly projecting boom 28 of the cradle frame section 14. It is to be understood that the supporting pad assemblies 156 are adapted to engage the opposite side lower surfaces of the bow of the boat 118 whereby the bow of the boat is supported from beneath and also cradled and maintained in position against lateral movement relative to the trailer 18. The pivotal mounting of the pad elements 160 of course enables the supporting pad assemblies 156 to readily conform to the cross sectional shape of substantially any type of boat.

With particular attention now directed to FIGURE 2 of the drawings it will be noted that the rear end of the cradle frame section 14 is also provided with a pair of supporting pad assemblies which are each generally designated by the reference numeral 164. Each of the supporting pad assemblies 164 includes an elongated pad element 166 which is pivotally secured between the furcations of a bifurcated bracket 168 by means of a pivot bolt 170. The bracket 168 includes a depending threaded shank portion 172 which is threadedly engaged in a suitable threaded aperture (not shown) formed in the cradle frame section 14. In this manner, the supporting pad assemblies 164 are each pivotally secured to the cradle frame section 14 for movement about an upstanding axis and are mounted for adjusted vertical movement relative to the cradle frame section 14.

As can be most clearly seen in FIGURE 2 of the drawings the actuating shaft 90 is provided with a shield 174 for shielding the idler pulley 94 and the portion of the flexible tension member entrained thereabout. The shield 174 insures that the tension member 112 will not become fouled with or dislodged from the idler pulley 94. Inasmuch as the pulleys 50 and 46 are journaled for rotation in the boom 28 and the standard assembly 30 respectively, a shield for these pulleys is not required.

In operation, assuming that the cradle frame section 14 is pivoted to the trailing position lying in a plane substantially paralleling the medial plane of the main frame section 12 as indicated in solid lines in FIGURE 4 of the drawings, the bow of the boat 118 will be supported and cradled by the supporting pad assemblies 156 carried by the main frame section 12. The rear end of the boat 118 will be supported and cradled by the supporting pad assemblies 164 carried by the cradle frame section 14. It is to be noted that the positions of the supporting pad assemblies 156 and 164 in elevation relative to the supporting roller assemblies 144 is sufficient to enable the supporting pad assemblies 156 and 164 to elevate the boat 118 with the lowermost surfaces of the keel of the boat spaced slightly above the supporting roller assemblies 144. It is further to be noted that the boat 118, when in position to be trailed on the trailer 10 has its bow abutting against the roller 138 of the idler pulley assembly 134 carried by the standard assembly 30.

If it is desired to launch the boat 118, the extensible motor 84 is actuated to pivot the lift arm assembly 70 toward the inclined position shown in phantom lines in FIGURE 4 of the drawings whereby the cradle frame section 14 will also be inclined as indicated by phantom lines in FIGURE 4.

As the cradle frame section 14 is pivoted to the inclined loading and unloading position shown in phantom lines in FIGURE 4 of the drawings, the supporting roller assemblies 144 carried by the cradle frame section 14 forwardly of its axis of rotation will elevate the bow of the boat 118 above the supporting pad assemblies 156 carried by the forward portion of the main frame section 12. Additionally, as the cradle frame section 14 is pivoted to an inclined position, the actuating shaft 90 will be pivoted in a clockwise direction as seen in FIGURE 2 of the drawings by means of the connecting links 106 and 142 whereby the lifting wheels 138 will be elevated sufficiently to lift the rear end of the boat 118 from engagement with the supporting pad assemblies 164 carried by the rear end of the cradle frame section. Thus, as the cradle frame section 14 is pivoted to an inclined position, the boat 118 is transferred from a supported position engaging the supporting pad assemblies 156 and 164 to a position supported by the supporting roller assemblies 144 and the lifting rollers or wheels 138. Either during the tilting of the cradle frame section 14 or after the cradle frame section 14 has been inclined to the loading and unloading position, the motor 100 of the winch mechanism 98 may be actuated to unreel a portion of the end of the tension member 112 wound about the drum 96 in order to enable the boat 118 to roll longitudinally and rearwardly of the trailer 10 on the supporting roller assemblies 144 and the lifting wheels 138 into the water.

If it is desired to load the boat 118 on the trailer 10, the depending keel of the boat 118 is first centered with respect to the rearmost support roller assembly 144 whereupon the winch mechanism 98 may be actuated to effect a pull on the free end of the tension member 112 carrying the hook 114 which is secured to the eye 116 on the bow of the boat 118.

During the loading operation, as the boat 118 is pulled forwardly along the cradle frame section 14, the supporting pad assemblies 164, while not actually supporting a portion of the weight of the boat 118, will provide guiding means insuring that the boat 118 will not rotate about its longitudinal axis. After the boat 118 has been pulled up the inclined cradle frame section 14 during the loading process and the bow of the boat 118 abuts the pulley 38, the extensible motor 84 may then be actuated to lower the lift arm assembly 70 thereby lowering the forward end of the cradle frame section 14 which will also lower the lifting wheels 138 enabling the boat 118 to eventually settle on and be supported and cradled by the supporting pad assemblies 156 and 164.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a boat trailer comprising a main frame and a cradle frame mounted on said main frame for pivotal movement about an axis extending transversely of said main frame between a raised forwardly and upwardly inclined position and a lowered generally horizontally disposed position, said cradle frame including a plurality of supporting rollers journaled for rotation about axes generally paralleling the axis of rotation of said cradle frame and spaced longitudinally of the latter with at least some of the rollers positioned forwardly of the axis of rotation of the cradle frame, said cradle frame including rear boat stern supporting pad assemblies mounted on said cradle frame for movement between raised and lowered positions relative to the medial plane of the cradle frame, means interconnecting said main and cradle frames for raising and lowering said boat supporting pad assemblies in response to movement of said cradle frame to said lowered and raised positions respectively, and said main frame forwardly of the axis of rotation of said cradle frame including forward boat bow supporting pad assemblies elevated relative to said main frame so as to be adapted to engage and stationarily support the bow of a boat positioned on said cradle frame just before final movement of said cradle frame to said lowered position and to enable the weight of the bow of said boat to be transferred from the bow supporting pad assemblies to the supporting rollers after initial movement of said cradle frame from said lowered position toward said raised position as said rear boat stern supporting pad assemblies are lowered relative to said supporting rollers to also transfer the weight of the stern of the boat from said stern supporting pad assemblies to said supporting rollers.

2. The combination of claim 1 wherein said cradle frame includes a bow stop on said forward end which has tension member guide means mounted on said upper portion, winding means rotatably mounted on said main frame having one end of a tension member wound thereon and including a pulley journaled for rotation about an axis coinciding with the axis of rotation of said cradle frame, said pulley and said guide means receiving said tension member between said main frame and said bow stop.

3. The combination of claim 1, wherein each of said supporting rollers is mounted for individual adjustment in vertical elevation relative to said cradle frame.

4. The combination of claim 1, wherein said support pad assemblies are each individually adjustable in vertical elevation relative to the corresponding frame.

5. The combination of claim 1, wherein said cradle frame is pivotally secured to said main frame for movement about a substantially horizontally disposed fixed axis extending transversely of a mid-portion of said cradle frame.

References Cited in the file of this patent

UNITED STATES PATENTS

| | | |
|---|---|---|
| 2,798,625 | Mano | July 9, 1957 |
| 2,805,786 | Green | Sept. 10, 1957 |
| 2,808,953 | Whitney | Oct. 8, 1957 |
| 2,835,401 | Byrd | May 20, 1958 |
| 2,856,091 | Johnson | Oct. 14, 1958 |
| 2,887,238 | Huber | May 19, 1959 |
| 2,923,425 | Galletta et al. | Feb. 2, 1960 |
| 2,957,593 | Evans | Oct. 25, 1960 |